(12) United States Patent
Rangarajan et al.

(10) Patent No.: US 8,020,165 B2
(45) Date of Patent: *Sep. 13, 2011

(54) DYNAMIC AFFINITY MAPPING TO REDUCE USAGE OF LESS RELIABLE RESOURCES

(75) Inventors: Madhusudhan Rangarajan, Round Rock, TX (US); Allen Chester Wynn, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 1416 days.

This patent is subject to a terminal disclaimer.

(21) Appl. No.: 11/467,600

(22) Filed: Aug. 28, 2006

(65) Prior Publication Data

US 2008/0052721 A1    Feb. 28, 2008

(51) Int. Cl.
*G06F 9/46* (2006.01)
*G06F 13/00* (2006.01)
*G06F 11/00* (2006.01)
(52) U.S. Cl. .................... 718/104; 711/154; 174/704
(58) Field of Classification Search .............. 718/105, 718/104; 714/704; 711/154
See application file for complete search history.

(56) References Cited

U.S. PATENT DOCUMENTS

| | | | |
|---|---|---|---|
| 6,249,802 B1 * | 6/2001 | Richardson et al. | 709/200 |
| 6,564,288 B2 * | 5/2003 | Olarig et al. | 711/105 |
| 7,500,078 B2 * | 3/2009 | Rangarajan et al. | 711/170 |
| 2003/0140271 A1 * | 7/2003 | Wynn et al. | 714/8 |
| 2005/0033948 A1 * | 2/2005 | Wei | 713/1 |
| 2006/0236165 A1 * | 10/2006 | Cepulis et al. | 714/721 |
| 2007/0074067 A1 * | 3/2007 | Rothman et al. | 714/6 |
| 2007/0143646 A1 | 6/2007 | Rangarajan et al. | |
| 2007/0214333 A1 | 9/2007 | Nijhawan et al. | |

OTHER PUBLICATIONS

Hewlett-Packard Corporation, Intel Corportation, Microsoft Corporation, Phoenix Technologies Ltd., Toshiba Corporation, Advanced Configuration and Power Interface Specification, 6 pages, Revision 3.0a, Dec. 30, 2005.

* cited by examiner

*Primary Examiner* — Meng A An
*Assistant Examiner* — Brian Chew
(74) *Attorney, Agent, or Firm* — Haynes and Boone, LLP (57) ABSTRACT

In an information handling system, a plurality of system resources are usable by at least one processor. An affinity structure includes elements describing the relative accessibility of the plurality of system resources to the processor. An affinity manager adjusts the affinity structure in response to a least a first one of the plurality of system resources operating outside of at least one operating parameter.

26 Claims, 9 Drawing Sheets

SRAT 300

| PROXIMITY DOMAIN | ADDRESS RANGE |
|---|---|
| 0 | DIMM0 |
| 0 | DIMM1 |
| 0 | DIMM2 |
| 0 | DIMM3 |
| 0 | DIMM4 |
| 0 | DIMM5 |

Figure 3

SLIT 400

|   | 0 | 1 | 2 |
|---|---|---|---|
| 0 | 10 | 20 | 30 |
| 1 | 20 | 10 | 255 |
| 2 | 30 | 255 | 10 |

SRAT 600

| PROXIMITY DOMAIN | ADDRESS RANGE |
|---|---|
| 0 | DIMM0 |
| 2 | DIMM1 |
| 0 | DIMM2 |
| 0 | DIMM3 |
| 1 | DIMM4 |
| 0 | DIMM5 |

Figure 6

SRAT 700

| PROXIMITY DOMAIN | ADDRESS RANGE |
|---|---|
| 1 | DIMM0 |
| 2 | DIMM1 |
| 3 | DIMM2 |
| 4 | DIMM3 |
| 5 | DIMM4 |
| 6 | DIMM5 |

Figure 7

SLIT 800

| | 0 | 1 | 2 | 3 | 4 | 5 | 6 |
|---|---|---|---|---|---|---|---|
| 0 | 10 | 10 | 30 | 10 | 10 | 20 | 10 |
| 1 | 10 | 10 | 255 | 255 | 255 | 255 | 255 |
| 2 | 30 | 255 | 10 | 255 | 255 | 255 | 255 |
| 3 | 10 | 255 | 255 | 10 | 255 | 255 | 255 |
| 4 | 10 | 255 | 255 | 255 | 10 | 255 | 255 |
| 5 | 20 | 255 | 255 | 255 | 255 | 10 | 255 |
| 6 | 10 | 255 | 255 | 255 | 255 | 255 | 10 |

SLIT 1200

|   | 0 | 1 | 2 | 3 | 4 | 5 | 6 | 7 |
|---|---|---|---|---|---|---|---|---|
| 0 | 10 | 20 | 20 | 20 | 30 | 40 | 40 | 40 |
| 1 | 20 | 10 | 20 | 20 | 40 | 30 | 40 | 40 |
| 2 | 20 | 20 | 10 | 20 | 40 | 40 | 30 | 40 |
| 3 | 20 | 20 | 20 | 10 | 40 | 40 | 40 | 30 |
| 4 | 30 | 40 | 40 | 40 | 10 | 255 | 255 | 255 |
| 5 | 40 | 30 | 40 | 40 | 255 | 10 | 255 | 255 |
| 6 | 40 | 40 | 30 | 40 | 255 | 255 | 10 | 255 |
| 7 | 40 | 40 | 40 | 30 | 255 | 255 | 255 | 10 |

Figure 12

SRAT 1100

| PROXIMITY DOMAIN | RESOURCE |
|---|---|
| 0 | PG0 |
| 0 | LM0 (RELIABLE) |
| 1 | PG1 |
| 1 | LM1 (RELIABLE) |
| 2 | PG2 |
| 2 | LM2 (RELIABLE) |
| 3 | PG0 |
| 3 | LM0 (RELIABLE) |
| 4 | LM0 (UNRELIABLE) |
| 5 | LM1 (UNRELIABLE) |
| 6 | LM2 (UNRELIABLE) |
| 7 | LM3 (UNRELIABLE) |

Figure 11

DYNAMIC AFFINITY MAPPING TO REDUCE USAGE OF LESS RELIABLE RESOURCES

BACKGROUND

The description herein relates to information handling systems and the handling of resources in such systems.

As the value and use of information continue to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs contain resources, such as memory resources, input/output (I/O) devices and ports, etc., that can experience errors. Some resources are designed such that minor errors can be corrected. For instance, in the case of memory resources, many systems store data in memory along with an ECC (Error Correcting Code) that allows single-bit errors in a data word to be corrected. In the case of network interfaces, various packet protocol layers have the capability to detect errors, with at least some protocols responding to an error by dropping an offending packets and/or requesting that the packet be resent.

SUMMARY

A method of operating an IHS comprises monitoring a system resource for operation according to at least one operating parameter. When the system resource is operating outside of the operating parameter, an affinity parameter for the system resource is adjusted. At least one component of the system reduces usage of the first system resource according to the affinity parameter. For instance, in one embodiment the system resource can be a memory device or portion thereof that is experiencing errors. After a given error rate or number of errors is reached, the system places the memory device in a different proximity domain that makes the memory device appear to the operating system as if it has a reachability from a processor than is less than the device's actual physical reachability. In response, the operating system will tend to allocate memory from a closer proximity domain first, but can still use the memory device under heavy load.

DETAILED DESCRIPTION

For purposes of this disclosure, an IHS includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, read only memory (ROM), and/or other types of nonvolatile memory. Additional components of the IHS may include one or more disk drives, one or more network ports for communicating with external devices as well as various I/O devices, such as a keyboard, a mouse, and a video display. The IHS may also include one or more buses operable to transmit communications between the various hardware components.

Figure 1:
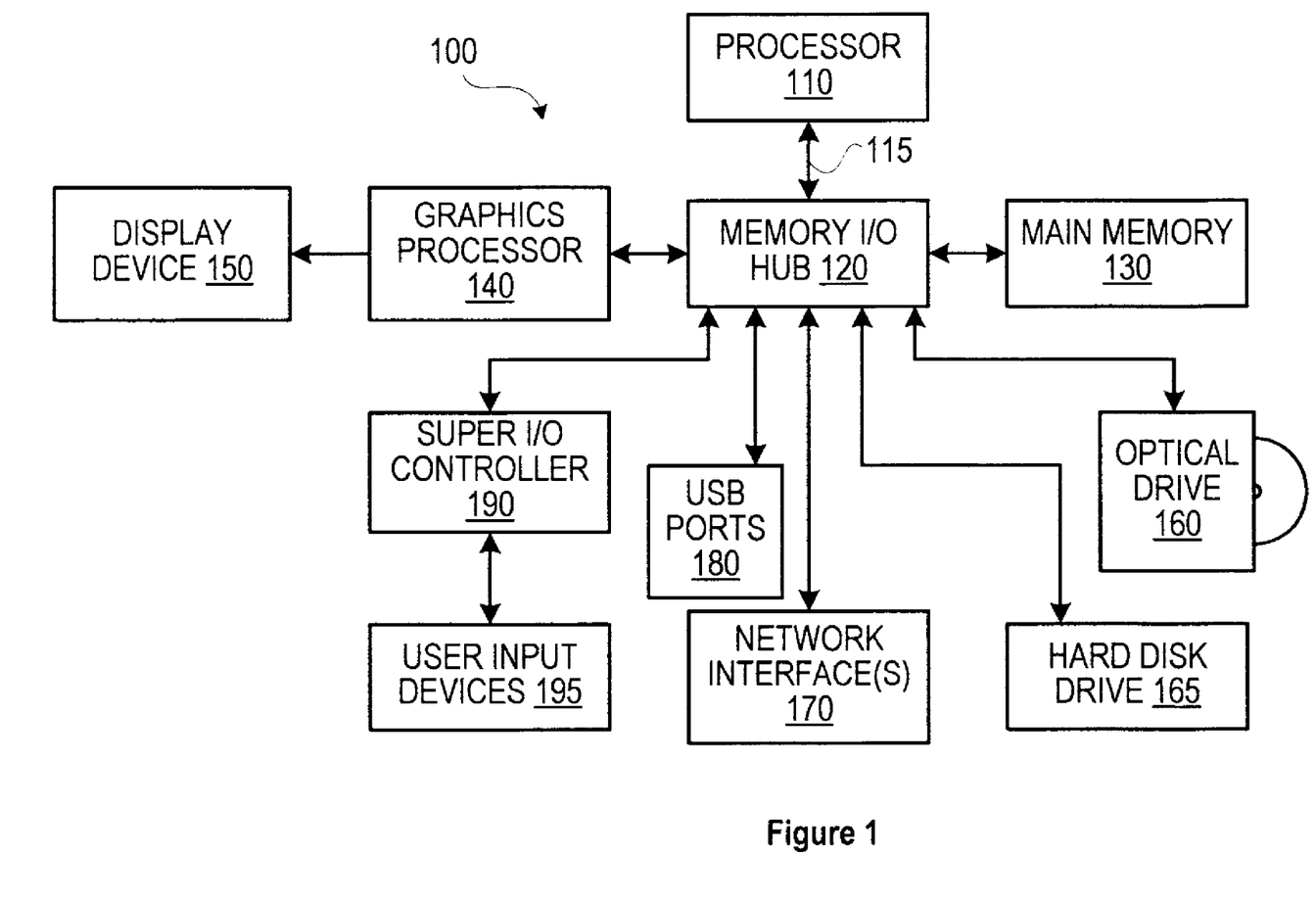
FIG. 1 is a block diagram illustrating an embodiment of an IHS.

FIG. 1 is a block diagram of one typical IHS. The IHS 100 includes a processor 110 such as an Intel Pentium series processor or one of many other processors currently available. A memory I/O hub chipset 120 connects to processor 110 over a front-side bus 115. Memory I/O hub 120 provides the processor 110 with access to a variety of resources. Main memory 130 connects to memory I/O hub 120 over a memory bus. A graphics processor 140 also connects to memory I/O hub 120, allowing the graphics processor to communicate, e.g., with processor 110 and main memory 130. Graphics processor 140, in turn, provides display signals to a display device 150.

Other resources can also be coupled to the system through memory I/O hub 120, including an optical drive 160 or other removable-media drive, one or more hard disk drives 165, one or more network interfaces 170, one or more USB (Universal Serial Bus) ports 180, and a super I/O controller 190 to provide access to user input devices 195, etc.

Not all IHSs include each of the components shown in FIG. 1, and other components not shown may exist. Furthermore, some components shown as separate may exist in an integrated package or be integrated in a common integrated circuit with other components. As can be appreciated, many systems are expandable, and include or can include a variety of components, including redundant or parallel resources.

The Advanced Configuration and Power Interface (ACPI) standard has been developed to allow operating system-directed configuration and power management on computers. The ACPI standard is described in the *Advanced Configuration and Power Interface Specification*, rev. 3.0a, Dec. 30, 2005, incorporated herein by reference. ACPI, among other things, describes an interface between an ACPI-compatible operating system and the system BIOS (Basic Input/Output System). This interface uses tables to describe system information, features, and methods for controlling those features.

Some IHSs, e.g. some servers, use designs that have multiple nodes, each with one or more processors and local memory, arranged in what is known as a Non-Uniform Memory Access (NUMA) architecture. The nodes are interconnected by NUMA interconnects, such that the memory local to one node is also accessible to the other nodes, although generally with a longer access time than a local memory access. A large memory space is thus distributed among the nodes, with memory devices existing at two or more proximities to each processor. In a NUMA system, it is most efficient for processes running on a certain node to use memory local to that node, or if not local, as close to the node as possible. Accordingly, it is desirable for an operating system to have proximity information available for the memory units and/or other redundant resources on the system. ACPI provides tables that allows processors, memory, and other resources to be associated with a node, and relative distances between the various nodes to be understood by the operating system. Two optional ACPI tables, the System Resource Affinity Table (SRAT) and the System Locality Distance Information Table (SLIT), contain information used by the operating system during initialization to determine resource affinity and proximity.

The SRAT follows a table format including a defined header that identifies a variable number of entries known as Static Resource Allocation Structures. Two types of structures are allowed to populate the entries: Processor Local APIC/SAPIC Affinity Structures and Memory Affinity Structures (APIC and SAPIC refer respectively to two different interrupt models, the Intel Advanced Programmable Interrupt Controller and Intel Streamlined Advanced Programmable Interrupt Controller). A Processor Affinity Structure identifies a specific processor by APIC or SAPIC ID, and associates that processor with a proximity domain. A Memory Affinity Structure identifies a memory range by Base Address and Length, and associates that memory range with a proximity domain. Each structure contains other fields and exists in a specific format defined in the ACPI Specification, the details of which are not necessary for an understanding of the embodiments described below.

The SLIT follows a table format that includes a defined header indicating the table length, the number N of System Localities (Proximity Domains) in the system, and an N×N matrix of relative proximity values, Entry☐☐. The value stored at Entry[x][y] represents the relative proximity of System Localities x and y. The proximity of a System Locality to itself (Entry[x][x]) is defined as a relative value of 10, with proximities lower than 10 disallowed. Other proximities are scaled accordingly, e.g., a proximity between two localities of 30 indicates that the locality is about three times slower to reach than a local access. A proximity of 255 is entered in Entry[x][y] when System Locality y is unreachable from System Locality x.

Figure 2:
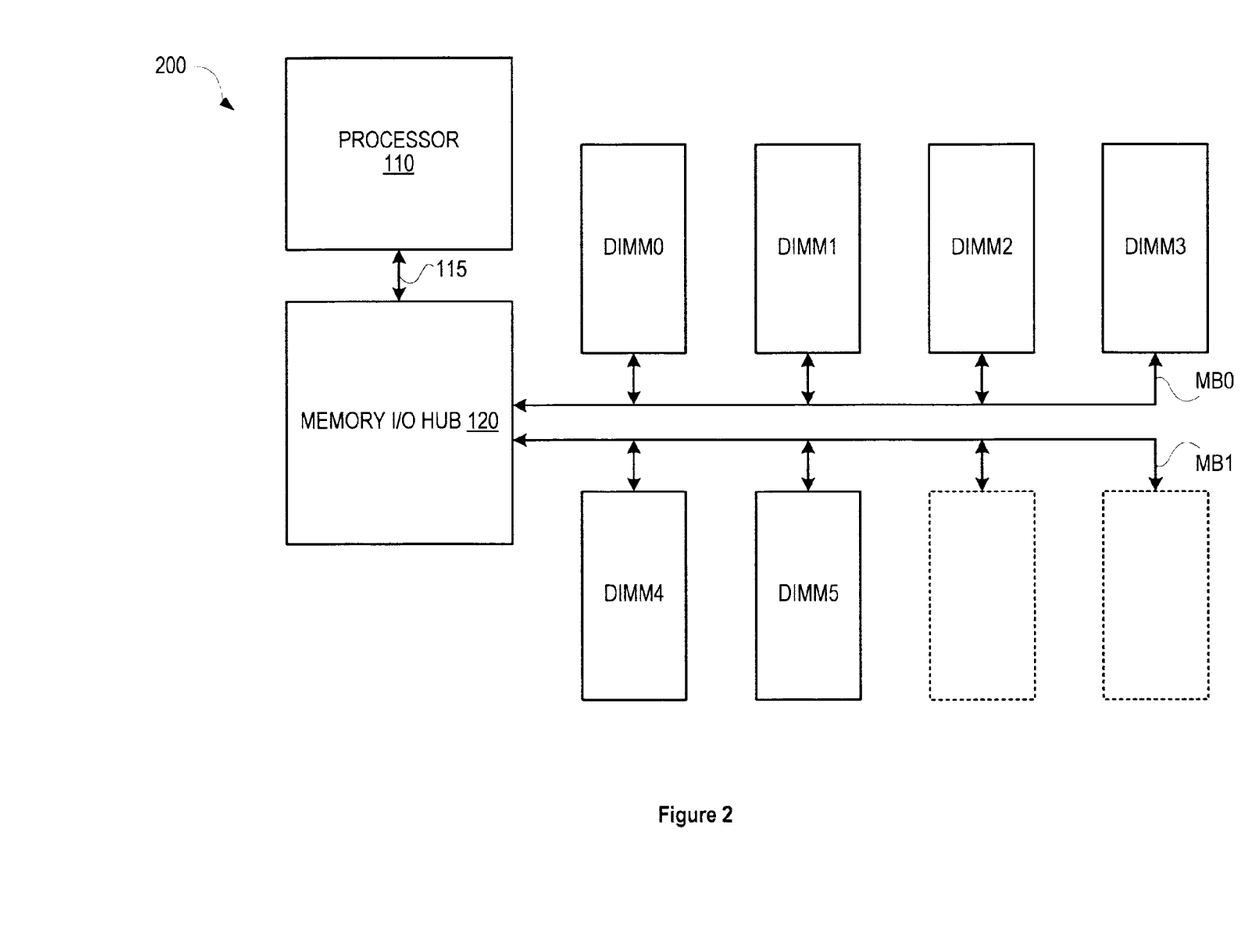
FIG. 2 illustrates a portion of an IHS having a plurality of memory modules, according to an embodiment.

Referring now to FIG. 2, an exemplary portion of an IHS 200 is illustrated, including a processor 110 connected by a front side bus 115 to a memory I/O hub 120, and a main memory subsystem comprising two memory buses MB0 and MB1 and six Dual In-line Memory Modules (DIMMs) DIMM0-DIMM5. Memory bus MB0 is illustrated as a multi-drop memory bus coupling memory I/O hub 120 to DIMMs DIMM0-DIMM3. Memory bus MB1 is illustrated as a multi-drop memory bus coupling memory I/O hub 120 to DIMMs DIMM4 and DIMM5, with two empty slots for additional DIMMs. Other exemplary systems may have a different number of memory buses, a different number of drops or slots for modules, may use other form factors such as SIMMs (Single In-line Memory Modules) or non-modular memory devices fixed to a motherboard, and/or may use point-to-point memory buses.

IHS 200 uses a design that allows each address on each DIMM to be accessed just as easily and quickly as each other address, assuming that the DIMM and/or bus serving that DIMM is available. In this sense, the physical "proximity" of each DIMM to processor 110, or other devices that access main memory, is equivalent. Were this configuration to be described in an ACPI SRAT, IHS 200 would be described in the table as having one "node" and one proximity domain, to which the single processor and six DIMMs are assigned. Since all DIMMs belong to the same proximity domain as processor 110, a single Memory Affinity Structure could be used in an ACPI SRAT to describe the range of memory addresses covered by all six DIMMs.

Figure 3:
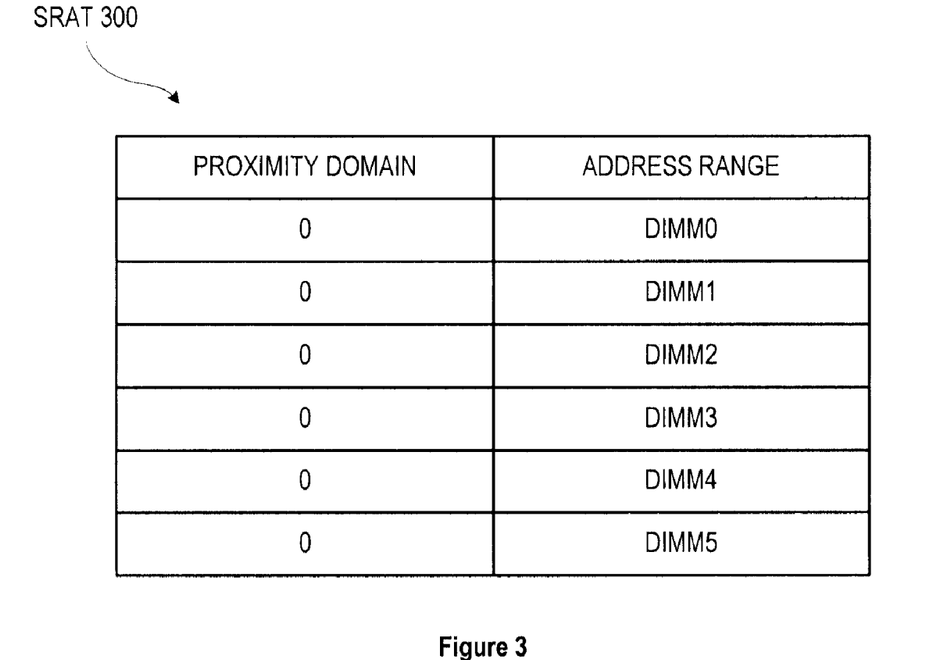
FIG. 3 shows a system resource allocation table (SRAT), according to an embodiment.

In one embodiment, multiple Memory Affinity Structures are used to describe the memory in the local proximity domain. For instance, a simplified SRAT 300 is shown in FIG. 3, illustrating only MAS entries and no PAS entries or header. Each MAS entry is further simplified to show only the fields representing a proximity domain and the fields representing the Base Address and Length (labeled "Address Range"). In SRAT 300, six MAS entries are used, one each for the address ranges corresponding to each DIMM. Accordingly, each MAS entry associates one of the DIMMs with Proximity Domain 0, the domain of the single processor 110.

Figure 4:
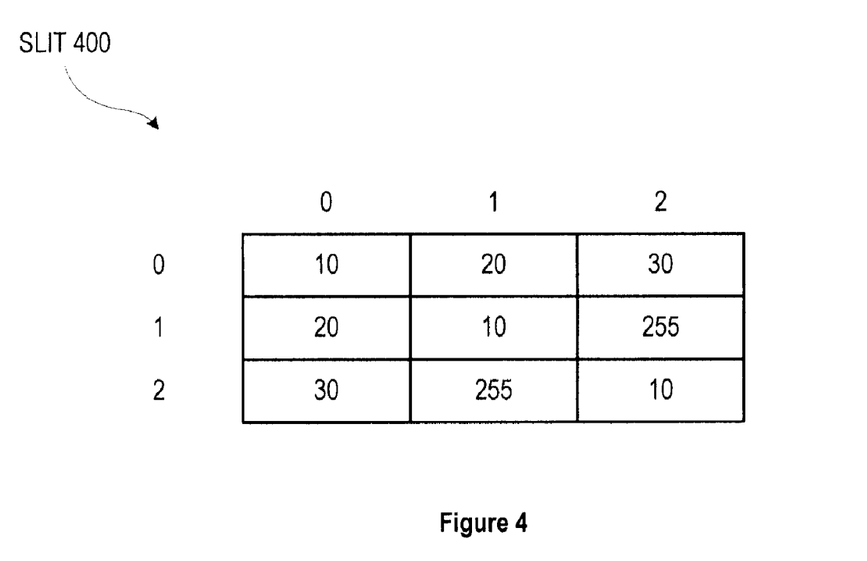
FIG. 4 shows a system locality distance information table (SLIT), according to an embodiment.

FIG. 4 depicts an exemplary simplified SLIT 400 that is to be used with SRAT 300 (only the Entry matrix is shown). SLIT 400 expresses proximities for three Proximity domains 0, 1, and 2. The proximity of domains 1 and 2 is set to 20, and the proximity of domains 2 and 3 is set to 30. Note that domains 1 and 2 are indicated as unreachable from each other.

In IHS 200, one or more of the processor, hub, and/or DIMMs test or monitor the addressable memory locations on each DIMM for errors. For instance, when the system is turned on a Power-On Self Test (POST) routine will write and then read bit patterns to/from each memory location, and will detect any memory locations that do not return the same bit pattern that was written. In many systems, data words are also stored in the DIMMs with extra bits comprising an ECC, e.g., that allows a system component to detect single and some multi-bit errors, and correct single-bit errors in data words. Other parity/error detection schemes exist in some memory designs, and in other types of resources such as those that handle data packets comprising multiple data words.

In one embodiment, hardware and/or software detects memory errors. A System Management Interrupt passes control to a BIOS routine that acts on the memory errors, determining whether one of the DIMMs is producing an undesirable number of errors. The BIOS routine can respond by moving the address range of the DIMM from its actual physical Proximity Domain 0 to a virtual Proximity Domain (1 or 2 in this example), and notifying the OS that the SRAT has been updated. This causes the OS to reduce usage of the offending DIMM relative to other DIMMs that are operating with better performance, and yet allows the DIMM to remain available for use by the OS under high load situations.

Figure 5:
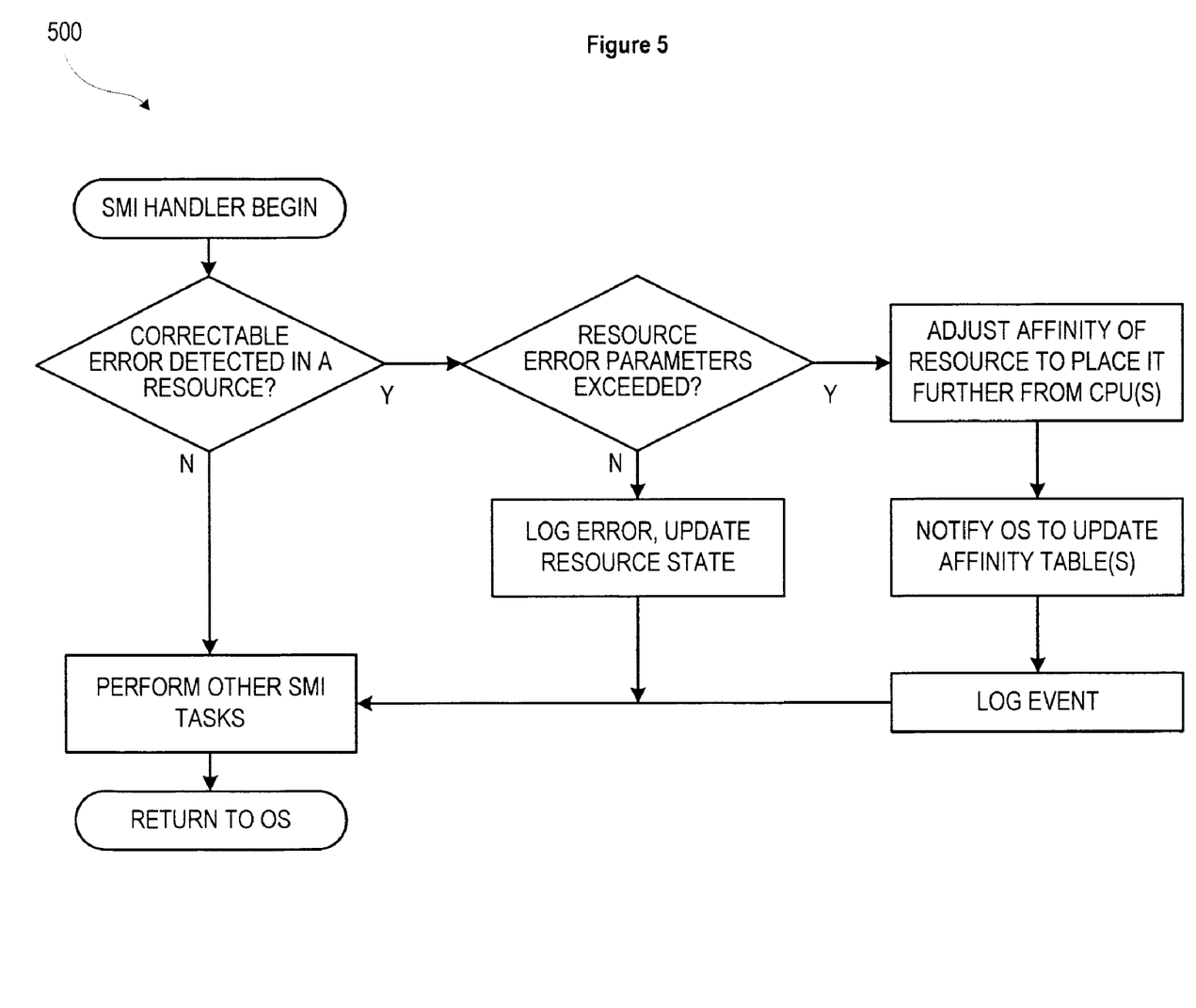
FIG. 5 contains a flowchart for a method of dynamic affinity adjustment, according to an embodiment.

FIG. 5 contains a flowchart 500 for one method implemented in a SMI handler routine. This example responds to the detection and correction of a correctable (e.g., single-bit) error detected in a resource, such as a DIMM. The SMI handler routine is configured with the ability to save resource state, e.g., for each MAS entry in SRAT 300. The state can include logging of each error detected by resource, a filtered error rate, a moving time window and associated error count in the window, or an absolute count of the number of errors detected.

The SMI handler routine is programmed with error parameters that will result in the relegation of a resource to a lower proximity domain. For instance, a hard threshold such as 10 errors total could trigger relegation of the resource, as could a given error rate. Should the error parameters be exceeded, the affinity of the resource is adjusted to place the resource further from the CPUs, and the OS is notified to update its affinity tables (e.g., SRAT and/or SLIT). The event is logged, and the SMI handler then performs other tasks as needed before returning control to the OS.

As the OS normally only checks the SRAT and SLIT during initialization, the OS is preferably modified to receive an indication that the SRAT and SLIT should be reloaded after dynamic modification. Alternately, permission to reboot could be requested, or the SRAT and SLIT could be retained but not consulted by the OS until reboot, for some other reason, causes the tables to be reloaded.

In some embodiments, resources can be tested against multiple error parameters, divided, e.g., by error severity or error frequency. A resource that has already been relegated, and continues to accumulate errors, can be relegated yet again to place it even further from the CPUs. Likewise, detected uncorrectable errors could trigger the relegation of a memory range to a far distant virtual proximity domain, indicating that the OS should only use the memory range for fault-tolerant memory applications.

Figure 6:
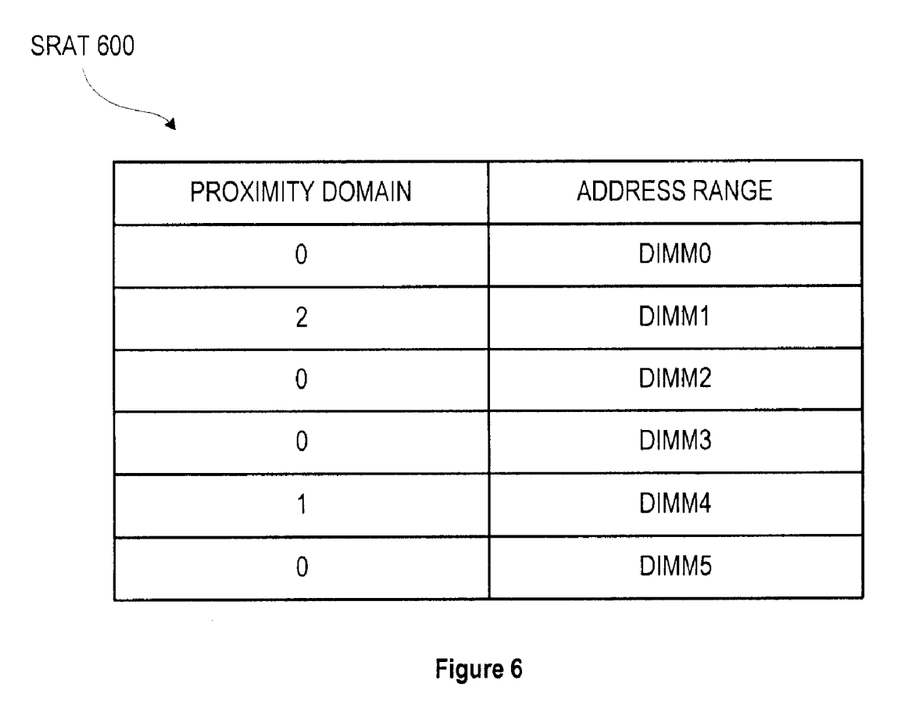
FIG. 6 illustrates an SRAT after modification to alter the affinity of two system resources, according to an embodiment.

An example of two stages of relegation is shown in the modified SRAT 600 of FIG. 6. In this example, correctable errors have accumulated to beyond a first threshold on DIMM4 and beyond a second threshold on DIMM1. The SMI handler of FIG. 5 has dynamically modified SRAT 300 to produce SRAT 600, with DIMM4 now assigned to virtual Proximity Domain 1 and DIMM1 now assigned to virtual Proximity Domain 2. Referring back to SLIT 400, the OS now will see accesses to DIMM4 as twice as costly and accesses to DIMM1 as three times as costly as accesses to DIMM0, DIMM2, DIMM3, and DIMM5.

Figure 7:
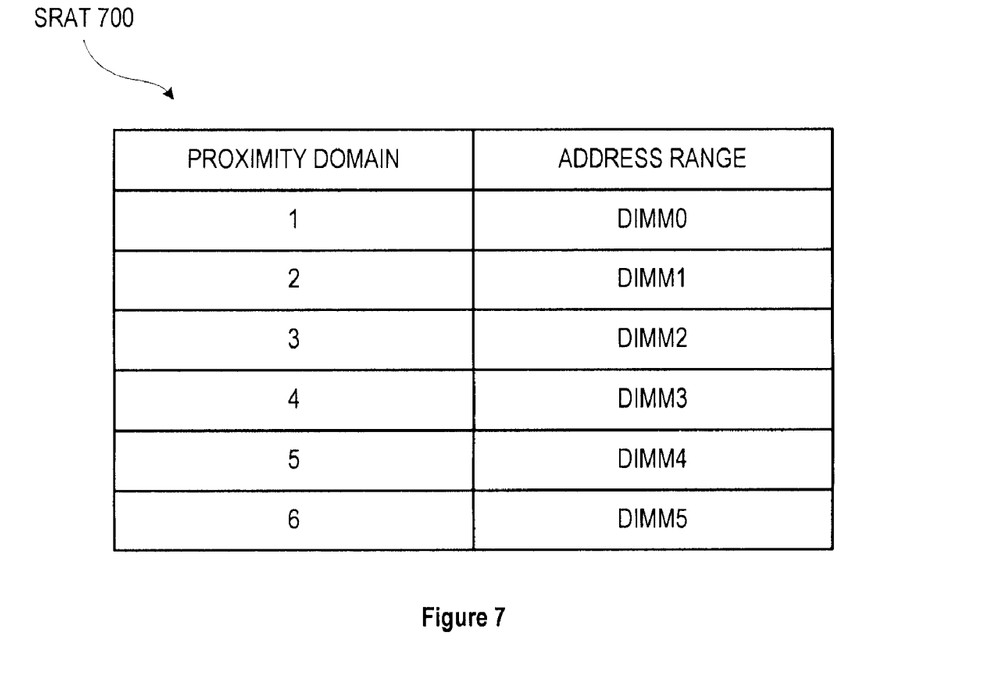
FIGS. 7 and 8 illustrate, respectively, an SRAT and SLIT according to a different embodiment that alters the affinity of the two system resources by modifying the SLIT.
Figure 8:
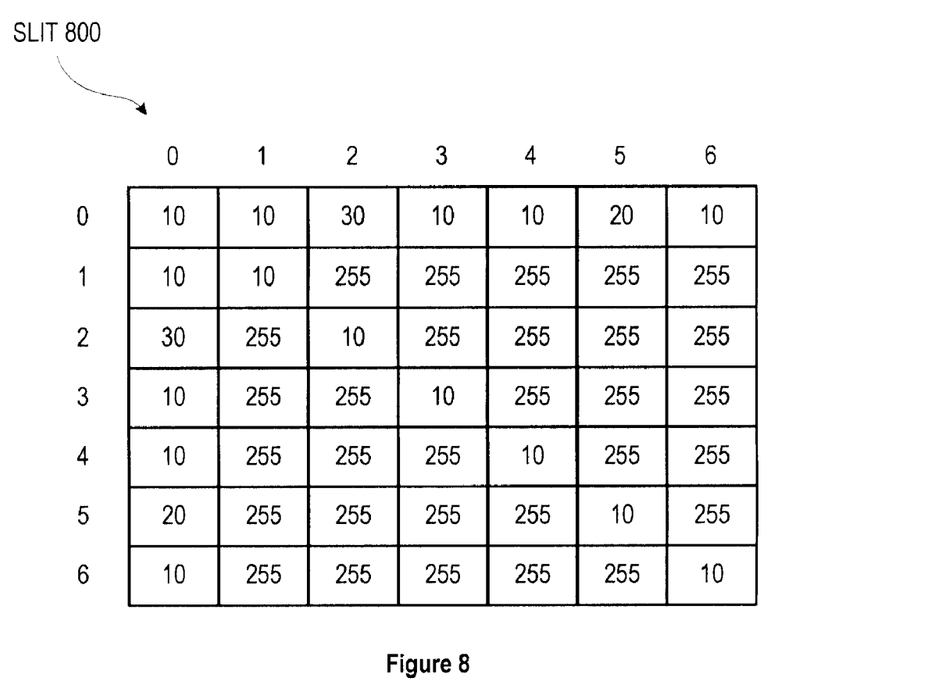

Another approach to achieve the same end is shown in FIGS. 7 and 8. An SRAT 700 assigns each DIMM to its own virtual Proximity Domain, none of which are the same as the Proximity Domain 0 of the processor. SLIT 800, however, is configured such that each virtual Proximity Domain has the minimum distance of 10 from Proximity Domain 0, unless relegated. Thus in SLIT 800, DIMM1 has been reassigned a proximity of 30 by modifying entries [0][2] and [2][0] of SLIT 800, and DIMM4 has been reassigned a proximity of 20 by modifying entries [0][5] and [5][0] of SLIT 800.

Alternate embodiments can have coarser or finer granularity or dynamically change the number of MAS entries to respond to resource problems. In the FIG. 2 embodiment, for instance, two MAS entries could be instantiated, one for MB0 and one for MB1, with errors tracked for each bus. Alternately, sections of each DIMM, such as each 64 MB address range, can each receive their own MAS entry and be tracked individually for errors. MAS entries also can be carved from a larger entry by tracking smaller divisions of memory than are represented in the original MAS entries. When a smaller division experiences problems, the larger entry containing that address range is divided into two or three MAS entries, allowing the problematic address range to be handled separately.

Figure 9:
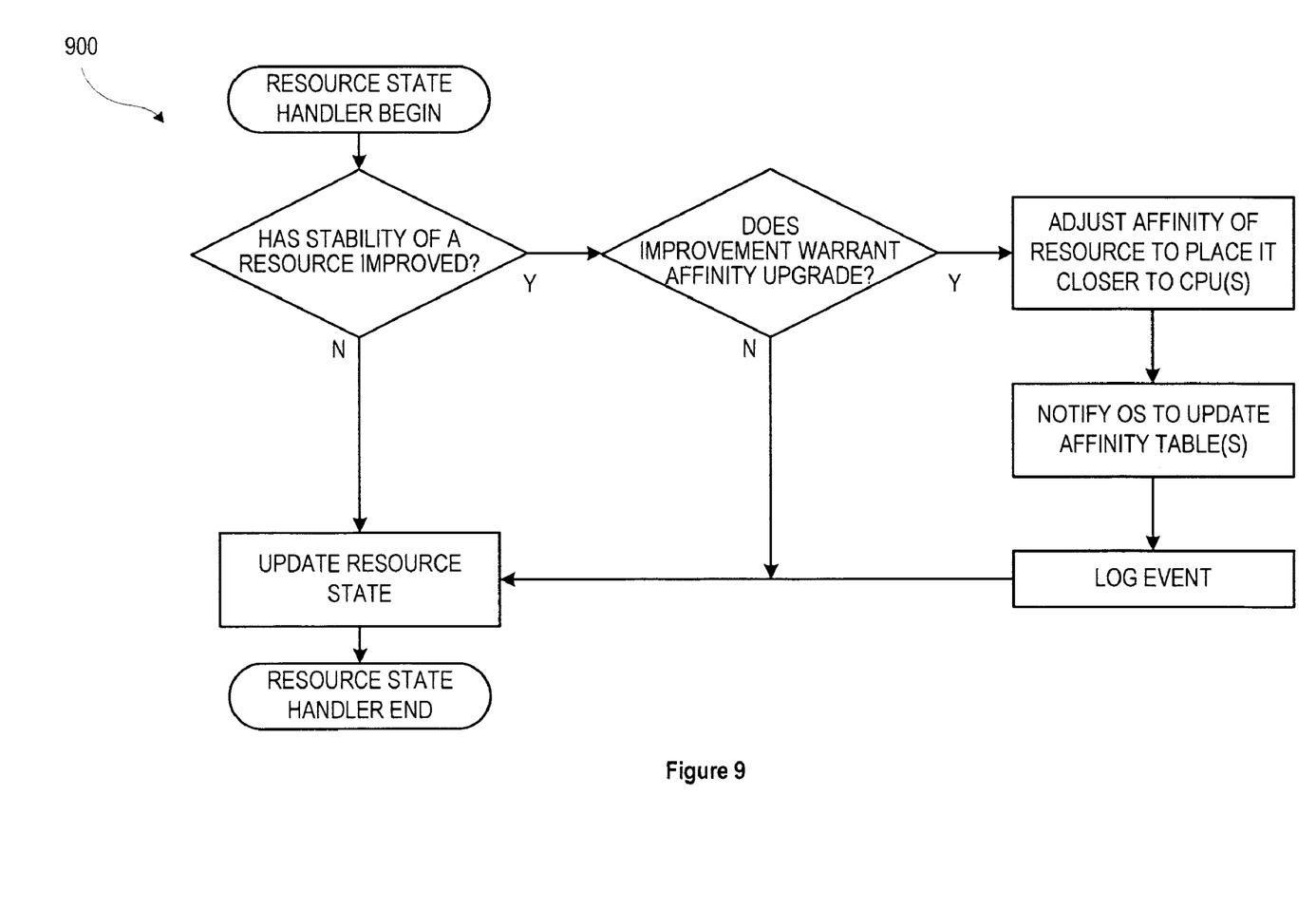
FIG. 9 contains a flowchart for a method of dynamic affinity adjustment for restoring a resource to a closer proximity position, according to an embodiment.

Embodiments can optionally include a mechanism for improving the proximity of a resource after a demonstrated period without errors. FIG. 9 illustrates a section of a resource state handler 900 as described above, for tracking the error performance of resources. Resource state handler also considers, for resources that have been relegated to a more distant proximity, whether the stability of the resource has improved (e.g., no new errors have been detected). The handler then considers, if an improvement has occurred, whether the improvement is such that an affinity upgrade is warranted. This step can be implemented by requiring a certain period of time without errors, or an error rate decreasing below a low threshold.

When the resource is to be upgraded, the resource handler adjusts affinity for the resource, e.g., by modifying the SRAT or SLIT as described above, and notifying the OS as described above.

Figure 10:
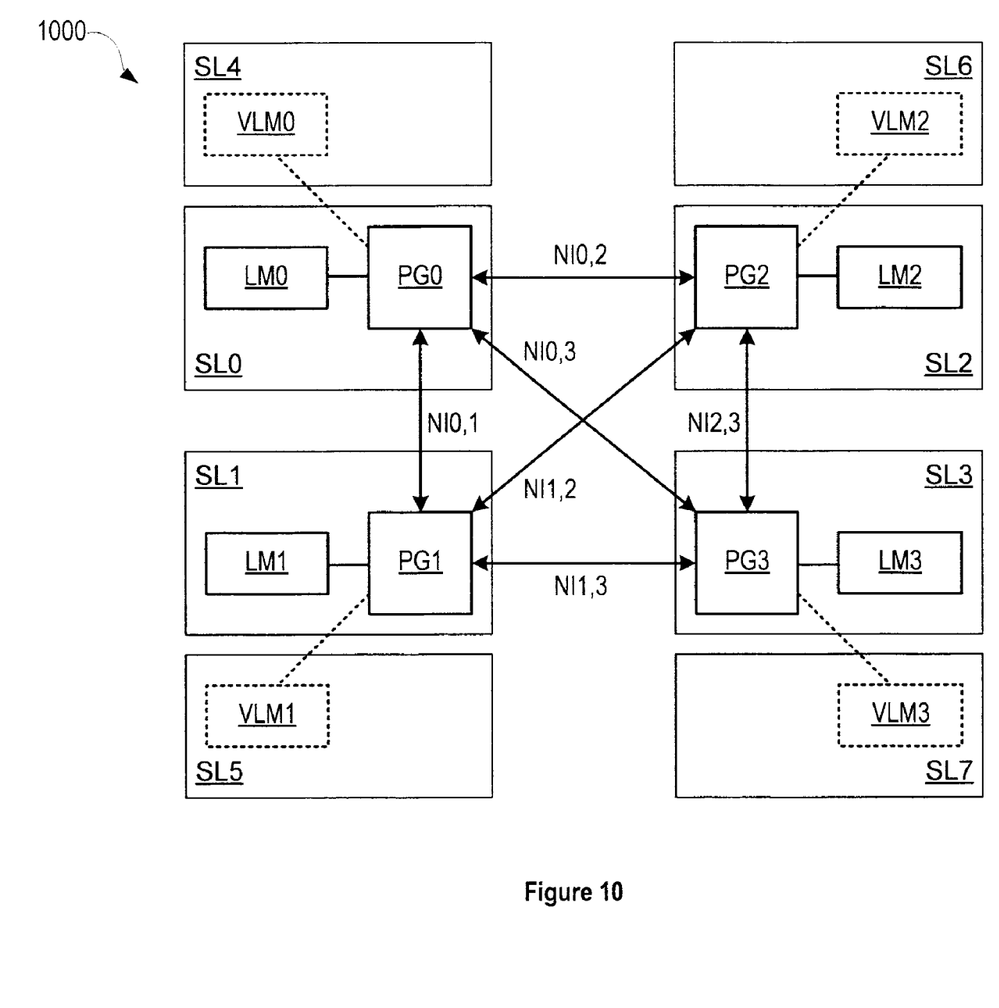
FIG. 10 illustrates a portion of an IHS with a plurality of Non-Uniform Memory Access (NUMA) nodes, according to an embodiment.

Although the above examples use a system with one processor and one physical resource System Locality, other examples can be implemented on a system with multiple physical resource System Localities. FIG. 10 illustrates components of a NUMA IHS 1000, including four processor groups PG0-PG3, four local memories LM0-LM3 connected to respective processor groups, and six NUMA interconnects NIx,y, where x and y are varied such that each processor group shares an interconnect with each other processor group. Each processor group and local memory is assigned to a corresponding SRAT system locality, i.e., PG0 and LM0 are assigned to system locality SL0, etc. Additionally, each processor group is "connected" to a "virtual" local memory in a corresponding virtual system locality, i.e., PG0 corresponds to a virtual local memory VLM0, located in a virtual system locality SL5, and so forth. The virtual local memory VLM0 is virtual in that it actually represents addressable regions of LM0 that have been "moved" to a different SRAT system locality due to the detection of correctable errors. Depending on the performance of the physical local memory components, none, some, or all of virtual system localities SL5-SL8 may be populated with address ranges from corresponding local memories LM0-LM3.

Figures 11, 12:
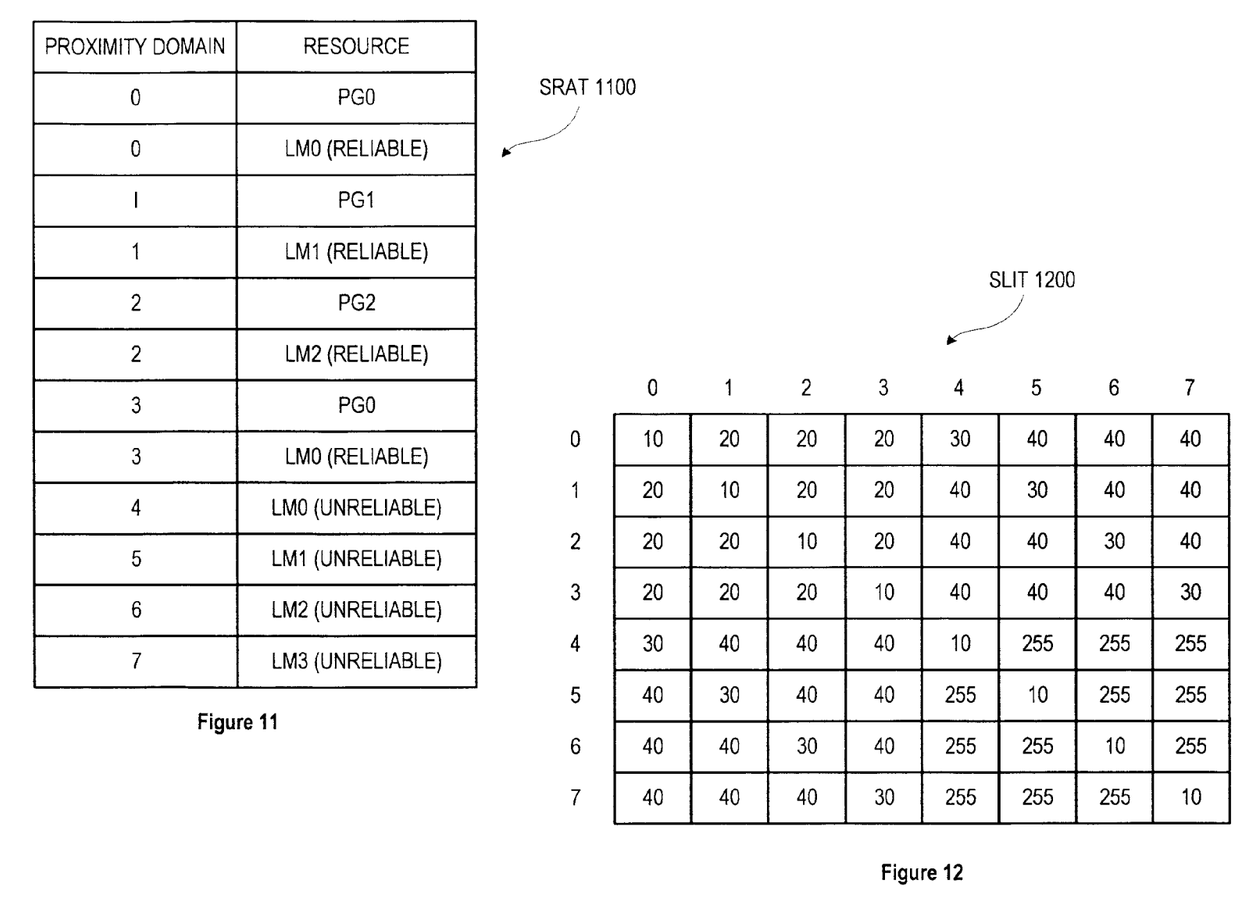
FIGS. 11 and 12 illustrate, respectively, an SRAT and SLIT example for the IHS of FIG. 10, according to an embodiment.

FIGS. 11 and 12 show exemplary SRAT and SLIT contents for the system 1000 configuration shown in FIG. 10. SRAT 1100 contains twelve entries. Four entries are for the four processor groups PG0-PG3 (if any processor group contains more than one processor, additional entries would be required), assigning them respectively to System Localities SL0-SL3. Four entries are for the sections of the four local memories LM0-LM3 that are deemed reliable, assigning them respectively to System Localities SL0-SL3. Using the techniques described in the preceding examples, each of these entries could be divided into multiple entries for multiple address ranges. The remaining four entries are for the sections of the four local memories LM0-LM3 that are deemed unreliable, assigning them respectively to System Localities SL4-SL7. Again, the number of entries will depend on the existence of and number of unreliable address ranges in each local memory.

SLIT 1200 contains an 8×8 matrix of proximity values. The diagonal is populated with proximity values of 10, ensuring that the OS will prefer to allocate each processor its own reliable local memory first. A proximity value of 20 is assigned to the remaining matrix elements with both column and row less than four, ensuring that the OS will as a second preference allocate each processor reliable memory local to one of the other processors. A proximity value of 30 is assigned to matrix elements associating a processor system locality with its corresponding virtual system locality (e.g., SL0 and SL4, SL1 and SL5, etc.) This ensures that the OS will as a third preference allocate each processor its own unreliable local memory. Fourth, a proximity value of 40 is assigned to matrix elements associating a processor system locality with another processors corresponding virtual system locality, ensuring that such memory is allocated last. Lastly, a proximity value of 255 is assigned to the cross-terms for the virtual system localities.

Other configurations are possible for a NUMA system, including assigning all unreliable memory to a common "non-preferred" locality that contains no processors. Furthermore, this approach can be used with resources other than memory, such as network interfaces and other memory-mapped resources. Other types of errors that can trigger an affinity parameter adjustment can include packet errors detected through a cyclic redundancy check, or parameters that indicate a resource is running abnormally. For instance, a component that is running hot could be moved to a more distant proximity to decrease the chances that a critical routine would be affected if the component were to fail.

In many embodiments, once the proximity of a resource is distance, usage of the resource will be reduced by the operating system preferring to allocate other similar but non-problematic resources first in the future. Under heavy load when all resources are needed the reduced usage may not be detectable, but on average the resource will experience reduced usage. Optionally, the OS may choose to copy data out of a resource to a more reliable location when the resource is downgraded.

Many other features of the described systems and methods may be varied as design parameters. Although an ACPI-based implementation is described, other implementations are possible. Those skilled in the art recognize that various features and elements are alternately implementable using hardware, BIOS, or operating system approaches.

Although illustrative embodiments have been shown and described, a wide range of other modification, change and substitution is contemplated in the foregoing disclosure. Also, in some instances, some features of the embodiments may be employed without a corresponding use of other features. Accordingly, it is appropriate that the appended claims be constructed broadly and in manner consistent with the scope of the embodiments disclosed herein.

What is claimed is:

1. A method of operating an information handling system (IHS), the method comprising:
    associating a plurality of system resources with proximity domains;
    monitoring a first system resource for operation according to at least one operating parameter, the first system resource being usable by at least one processor;
    when the first system resource is operating outside of the at least one operating parameter, adjusting at least one affinity parameter for the first system resource to modify a first proximity domain of the first system resource to a first modified proximity domain that is further away from the at least one processor; and
    in response to modifying the first proximity domain of the first system resource to the first modified proximity domain, reducing usage of the first system resource relative to usage of alternate system resources that are in proximity domains that are closer to the at least one processor than the first modified proximity domain; and
    readjusting the at least one affinity parameter for the first system resource to modify the first modified proximity domain of the first system resource to a second modified proximity domain that is closer to the at least one processor than the first modified proximity domain to allow increased usage of the first system resource.

2. The method of claim 1, wherein monitoring the first system resource comprises tracking correctable errors for the first system resource.

3. The method of claim 2, wherein the at least one operating parameter comprises an error count threshold, further comprising determining that the first system resource is operating outside of the at least one operating parameter by comparing the tracked correctable errors to the error count threshold.

4. The method of claim 3, wherein the at least one operating parameter comprises an error rate, further comprising determining that the first system resource is operating outside of the at least one operating parameter by comparing a rate based on the tracked correctable errors to the error rate.

5. The method of claim 2, wherein the readjusting comprises:
    readjusting the at least one affinity parameter for the first system resource to modify the first modified proximity domain of the first system resource to the second modified proximity domain that is closer to the at least one processor than the first modified proximity domain after a period of time with no tracked correctable errors for the first system resource.

6. The method of claim 1, wherein the at least one affinity parameter is adjusted by a routine called in response to a system management interrupt.

7. The method of claim 6, wherein the routine notifies an operating system that the at least one affinity parameter has been adjusted.

8. The method of claim 7, wherein the operating system responds to the notification by reading the at least one affinity parameter.

9. The method of claim 7, wherein the operating system responds to the notification by rebooting the system.

10. The method of claim 1, wherein the proximity domains include physical proximity domains and virtual proximity domains, and wherein the modifying the first proximity domain of the first system resource to the first modified proximity domain comprises modifying a physical proximity domain of the first system resource to a virtual proximity domain.

11. The method of claim 1, wherein modifying the proximity domain of the first system resource comprises creating a memory affinity structure for the first system resource.

12. The method of claim 1,
    wherein the proximity domains associate the plurality of system resources with distances from the at least one processor, wherein adjusting the at least one affinity parameter to modify the first proximity domain of the first system resource to a first modified proximity domain that is further away from the at least one processor comprises increasing the distance of the first system resource from the at least one processor.

13. The method of claim 1, wherein the first system resource comprises a memory device.

14. The method of claim 1, wherein the first system resource comprises a range of memory addresses.

15. The method of claim 1, wherein the first system resource comprises an input/output device.

16. The method of claim 1, wherein reducing usage of the first system resource relative to usage of alternate resources in the system that are in proximity domains that are closer to the at least one processor than the first modified proximity domain comprises using the first system resource only when the alternate resources that are in proximity domains that are closer to the at least one processor than the first modified proximity domain are already in use.

17. An IHS comprising:
  at least one processor;
  a plurality of system resources usable by the at least one processor and associated with proximity domains;
  an affinity structure comprising the proximity domains describing relative accessibility of the plurality of system resources to the at least one processor; and
  an affinity manager to adjust the affinity structure in response to at least one system resource of the plurality of system resources operating outside of at least one operating parameter, wherein the affinity structure is operable to modify a first proximity domain of the at least one system resource to a first modified proximity domain that is less accessible by the at least one processor such that the usage of the at least one system resource is reduced relative to the usage of alternative systems resources that are in proximity domains that are more accessible by at least one processor than the first modified proximity domain, wherein the affinity structure is further operable to modify the first modified proximity domain of the at least one system resource to a second modified proximity domain that is closer to the at least one processor than the first modified proximity domain to allow increased usage of the at least one system resource.

18. The IHS of claim 17, wherein the affinity manager tracks correctable errors for the at least one system resource.

19. The IHS of claim 18, wherein the at least one operating parameter comprises an error count threshold, the affinity manager determining that the at least one system resource is operating outside of the at least one operating parameter by comparing the tracked correctable errors for the at least one system resource to the error count threshold.

20. The IHS of claim 18, wherein the at least one operating parameter comprises an error rate, the affinity manager determining that the at least one system resource is operating outside of the at least one operating parameter by comparing a rate based on the tracked correctable errors for the at least one system resource to the error rate.

21. The IHS of claim 17, wherein the affinity manager comprises a routine called in response to a system management interrupt.

22. The IHS of claim 17, wherein the at least one system resource comprises a memory device.

23. The IHS of claim 17, wherein the at least one system resource comprises a range of memory addresses.

24. The IHS of claim 17, wherein the least one system resource comprises an input/output device.

25. The IHS of claim 17, further comprising:
  a resource allocator that selects resources based on the affinity structure.

26. The IHS of claim 17, wherein the at least one processor includes at least first and second processors, the plurality of resources comprising first resources relatively more accessible to the first processor and second resources relatively more accessible to the second processor, and the affinity manager adjusts the affinity structure such that a first subset of the first resources operating outside of at least one operating parameter appear less accessible to the first processor than a second subset of the first resources operating within operating parameters and a first subset of the second resources operating outside of at least one operating parameter appear less accessible to the second processor than a second subset of the second resources operating within operating parameters.

* * * * *